United States Patent
Fike et al.

(10) Patent No.: US 7,463,646 B2
(45) Date of Patent: Dec. 9, 2008

(54) METHOD AND SYSTEM FOR FIBRE CHANNEL ARBITRATED LOOP ACCELERATION

(75) Inventors: John M Fike, Austin, TX (US); Patricia E Hareski, Austin, TX (US)

(73) Assignee: Qlogic Corporation, Aliso Viejo, CA (US)

( * ) Notice: Subject to any disclaimer, the term of this patent is extended or adjusted under 35 U.S.C. 154(b) by 584 days.

(21) Appl. No.: 10/889,267

(22) Filed: Jul. 12, 2004

(65) Prior Publication Data

US 2005/0013318 A1 Jan. 20, 2005

Related U.S. Application Data

(60) Provisional application No. 60/492,346, filed on Aug. 4, 2003, provisional application No. 60/490,747, filed on Jul. 29, 2003, provisional application No. 60/487,887, filed on Jul. 16, 2003, provisional application No. 60/487,876, filed on Jul. 16, 2003, provisional application No. 60/487,875, filed on Jul. 16, 2003, provisional application No. 60/487,873, filed on Jul. 16, 2003, provisional application No. 60/487,667, filed on Jul. 16, 2003, provisional application No. 60/487,665, filed on Jul. 16, 2003.

(51) Int. Cl.
*H04L 12/42* (2006.01)
(52) U.S. Cl. ...................... 370/462; 370/461
(58) Field of Classification Search ............ 370/462, 370/252, 248, 241, 217, 218, 227, 461, 405, 370/406
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | ..................... 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | ................... 370/58 |

(Continued)

FOREIGN PATENT DOCUMENTS

EP 0649098 9/1994

(Continued)

OTHER PUBLICATIONS

Claudio DeSanti, "Virtual Fabrics Switch Support"; VF Switch Support, T11/04-395v2. Sep. 2004, pp. 1-15.

(Continued)

*Primary Examiner*—Brian D Nguyen
(74) *Attorney, Agent, or Firm*—Klein, O'Neill & Singh, LLP

(57) ABSTRACT

A fibre channel switch element with an acceleration device that connects plural fibre channel devices in an arbitrated loop and monitors frames sent during a loop initialization process is provided. The acceleration device creates an AL_PA table selected by each fibre channel device, wherein the AL_PA table is used for port selection; and during an arbitration process sends a benign primitive to non-arbitrating devices. The acceleration device includes, a global arbitration module, a state machine module, and a matrix for connecting plural fibre channel devices.

13 Claims, 12 Drawing Sheets

U.S. PATENT DOCUMENTS

| | | | |
|---|---|---|---|
| 4,546,468 A | 10/1985 | Christmas et al. | 370/54 |
| 4,569,043 A | 2/1986 | Simmons et al. | 370/63 |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,260,935 A | 11/1993 | Turner | |
| 5,339,311 A | 8/1994 | Turner | |
| 5,367,520 A | 11/1994 | Cordell | 370/60 |
| 5,390,173 A | 2/1995 | Spinney et al. | |
| 5,537,400 A | 7/1996 | Diaz et al. | |
| 5,568,165 A | 10/1996 | Kimura | |
| 5,568,614 A | 10/1996 | Mendelson et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,768,271 A | 6/1998 | Seid et al. | |
| 5,768,533 A | 6/1998 | Ran | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,055,618 A | 4/2000 | Thorson | |
| 6,061,360 A * | 5/2000 | Miller et al. | 370/455 |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,151,644 A | 11/2000 | Wu | |
| 6,160,813 A | 12/2000 | Banks et al. | 370/422 |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,289,002 B1 | 9/2001 | Henson et al. | |
| 6,301,612 B1 | 10/2001 | Selitrennikoff et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry, Jr. et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,947,393 B2 | 9/2005 | Hooper, III | |
| 6,952,659 B2 | 10/2005 | King et al. | |
| 6,968,463 B2 | 11/2005 | Pherson et al. | |
| 6,987,768 B1 | 1/2006 | Kojima et al. | |
| 6,988,130 B2 | 1/2006 | Blumenau et al. | |
| 6,988,149 B2 | 1/2006 | Odenwald | |
| 7,000,025 B1 | 2/2006 | Wilson | |
| 7,002,926 B1 | 2/2006 | Eneboe et al. | |
| 7,010,607 B1 | 3/2006 | Bunton | |
| 7,024,410 B2 | 4/2006 | Ito et al. | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 | 5/2006 | Blumenau et al. | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B1 | 10/2006 | Goto et al. | |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,188,364 B2 | 3/2007 | Volpano | |

| | | |
|---|---|---|
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,206,288 B2 * | 4/2007 | Cometto et al. .............. 370/249 |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 * | 9/2007 | Cashman et al. ............. 370/217 |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,352,740 B2 | 4/2008 | Hammons et al. |
| 2001/0011357 A1 | 8/2001 | Mori |
| 2001/0022823 A1 | 9/2001 | Renaud |
| 2001/0038628 A1 | 11/2001 | Ofek et al. ................. 370/392 |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 * | 1/2003 | Mullendore et al. ......... 370/276 |
| 2003/0026267 A1 | 2/2003 | Oberman et al. |
| 2003/0026287 A1 | 2/2003 | Mullendore et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 * | 5/2003 | Berman ..................... 370/252 |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0115355 A1 | 6/2003 | Cornetto et al. |
| 2003/0117961 A1 | 6/2003 | Chuah et al. |
| 2003/0120743 A1 | 6/2003 | Coatney et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0137941 A1 | 7/2003 | Kaushik et al. |
| 2003/0172149 A1 | 9/2003 | Edsail et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 * | 10/2003 | Westby ....................... 370/402 |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054866 A1 | 3/2004 | Blumenau et al. |
| 2004/0057389 A1 * | 3/2004 | Klotz et al. .................. 370/252 |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ....................... 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 * | 2/2005 | Leedy ........................ 257/678 |
| 2005/0036499 A1 | 2/2005 | Dutt et al. |
| 2005/0036763 A1 | 2/2005 | Kato et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0117522 A1 * | 6/2005 | Basavaiah et al. ............ 370/252 |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0184711 A1 | 8/2006 | Pettey |
| 2006/0203725 A1 | 9/2006 | Paul et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

Pelissier et al, "Inter-Fabric Routing", dated Jul. 30, 2004, Inter Fabric Routing (04-520v0); pp. 1-31.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", *Curtis A. Ridgeway, Distinguished I/O Architect, Storage and Computing ASIC's Division, LSI Logic Corp.*, Feb. 3, 2003.

Malavalli, Kumar, "High Speed Fibre Channel Switching Fabric Devices", *Proceedings of the SPIE, SPIE*, Bellingham, VA, USA vol. 1577., XP000562869, ISSN: 0277-786X,(Sep. 4, 1991),216-226.

Melhem, et al., "Minimizing Wavelength Conversions in WDM Path Establishment", *Computer Science Department*, University of Pittsburgh, Pittsburgh, PA 15260, (2001), 197-211.

Ridgeway, Curt, "0GFC-40GFC using 4-lane XAUI's", *LSI Logic Presentation*—T11/03-069v0, Feb. 3, 2003.

"Deliver Server-Free Backup", *Pathlight & Computer Associates*, White Paper of Apr. 2000, Ithaca, New York, XP-002381153, 1-8.

Naik, D., "Inside Windows Storage:Server Storage Technologies for Windows 2000, Windows Server 2003 and Beyond", *Addison-Wesley, US, Chapter 5*, XP-002381152, (Jul. 15, 2003),137-173.

Banks, David C., et al., "Link Trunking and Measuring Link Latency in Fibre Channel Fabric", U.S. Appl. No. 60/286,046, 1-52.

Brown, Douglas W., "A State-Machine Synthesizer", *18th Design Automation Conference*, (1981),301-305.

"Examination Report from the European Patent Office dated Oct. 12, 2007 for European Application No. 05 805 636.6".

"Office Action from USPTO dated Sep. 4, 2007 for U.S. Appl. No. 10/889,551".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 2007 for U.S. Appl. No. 10/664,548".

"Office Action from USPTO dated Sep. 20, 2007 for U.S. Appl. No. 10/798,527".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 6, 2007 for U.S. Appl. No. 10/889,337".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

Malavalli, et al., "Fibre Channel Framing and Signaling (FC-FS) Rev 1.10", *NCITS working draft proposed American National Standard for Information Technology*, (Jan. 25, 2001).

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Mar. 20, 2008 for U.S. Appl. No. 10/894,732".

"Final Office Action from USPTO dated Apr. 1, 2008 for U.S. Appl. No. 10/956,717".

"Office Action from USPTO dated Apr. 3, 2008 for U.S. Appl. No. 10/894,587".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Office Action from USPTO dated Apr. 14, 2008 for U.S. Appl. No. 10/894,627".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".

"Final Office Action from USPTO dated May 21, 2008 for U.S. Appl. No. 10/889,635".

* cited by examiner

METHOD AND SYSTEM FOR FIBRE CHANNEL ARBITRATED LOOP ACCELERATION

CROSS-REFERENCE TO RELATED APPLICATIONS

This application claims priority under 35 USC Section 119(e), to the following provisional patent applications:
Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

BACKGROUND

The disclosures of the foregoing applications are incorporated herein by reference in their entirety.

1. Field of the Invention

The present invention relates to networks, and more particularly, to reducing latency in a fibre channel arbitrated loop environment.

2. Background of the Invention

Fibre channel is a set of American National Standard Institute (ANSI) standards, which provides a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

FC-AL is one fibre channel standard (incorporated herein by reference in its entirety) that establishes the protocols for an arbitrated loop topology.

In a Fibre Channel Arbitrated Loop (FC-AL) implementation of each device on the loop must have the intelligence to process incoming data in accordance with FC-AL rules. Latency occurs due to every device in the loop, as data is processed. This latency is accumulated around the loop. Even when a device is only required to pass data to the next device, it still has latency before passing on the data, because the device must continuously process data for changes in state. The accumulated latency slows down data transfers in a heavily populated loop.

The traditional FC-AL implementation has a transmitter of one device connected to the receiver of the next device and so on until the transmitter of the last device is connected to the receiver of the first device, creating a loop, as shown in FIG. 2.

In the traditional FC-Al implementation, all fibre channel devices ("FCDs"), to properly follow the FC-AL protocol, need to implement a LPSM. The LPSM has the following states: initializing, open-initiate, monitoring, arbitrating, arbitration won, open, opened, transmitted close, received close, transfer, and old-port (optional) before the FC-AL standard.

Under the FC-AL standard, there can be a maximum of 127 devices on a loop. Every device on the loop must be operating correctly for the loop to be operational. Because of this, many implementations include a bypass element that allows loop connectivity to be maintained when a particular device is not available for proper operation. Standard bypass elements are not intelligent devices and are not controlled based on data being transmitted but on device functionality or availability. These bypass elements do not add latency, but add jitter.

Each connected device must follow the FC-AL standard by decoding primitives, maintaining a Loop Port State Machine (LPSM), obtaining AL_PA's through the LIP process, performing arbitration, and sending frames in a manner that is consistent with the standard.

The following introduces some FC-AL process steps and how these processes add delay/latency:

LIP Process: In the traditional FC-AL implementation, the LIP process is started when one or more of the devices on the loop start sending LIPs to the next device in the loop. After all devices have seen the LIP, a temporary master is selected and this master sends out various frames that each device uses to select an AL_PA. The frames are sent in a serial fashion and the master must get the first frame back before sending the next type of frame. There are several trips around the loop before the LIP process is completed. Each device acquires an AL_PA and only needs to know its own AL_PA to be FC-AL compliant. Thus when all the frames return to the master, all the participating devices have their AL_PA's. The AL_PA's are used for identification and priority evaluation in the arbitration.

Each device in the loop takes time to process incoming data and deciding (per FC-AL standard) what to send out to its transmitter. Thus each device adds to latency and slows data processing. Two major points of latency are the time delay to create (and close) the loop circuit and the time delay for frames to be passed back and forth. To create a loop circuit in a traditional implementation the device must arbitrate for access and then open the device.

Arbitration process: In the traditional FC-AL implementation, the device desiring access to the loop does arbitration. In order to arbitrate and win arbitration, the device must send arbitration primitives and receive the arbitration primitive back.

In the simplest case, only one device wants access. The device that wants access to the loop sends its arbitration primitive to the next device in the loop and after some processing the next device passes the arbitration primitive onto the next device and so on until the primitive returns to the originating device. Therefore, for the FCD to know it has won arbitration there is an entire loop delay, even if it is the only device that wants access to the loop.

Open process: In the traditional FC-AL implementation to complete a loop circuit, the winning device needs to open the device it wants to communicate with. To open the other device and know that it is open (using zero BB_Credit) the device sends an open primitive and receives back an R_RDY primitive. The open primitive (OPN) is sent by the winning device to the next device, which processes it and sends it on to the next device and so on until the destination device receives the open primitive. Then the destination FCD sends a R_RDY primitive to the next device it is connected to and that device processes the primitive and sends it to the next device and so on, until the R_RDY primitive reaches the winning FCD. Thus to open the loop circuit and to know it is open, causes a delay around the loop.

"Open Replicate" process: In the traditional FC-AL implementation, to complete the loop circuit a winning FCD can send an open replicate primitive(s). When the winning FCD does a broadcast open replicate then every FCD will replicate the incoming frames and send them out to the next device. When the winning FCD does a specific open replicate then it sends out a number of open replicate primitives to inform the FCDs (that it wants to communicate) to replicate the frames on the incoming port and also send the frame on to the next device. There are no R_RDY primitives sent for an open replicate primitive, so frames can quickly follow the open primitive(s), but there is still delay to pass the frames around the entire loop.

Close process: In the traditional implementation to close the loop circuit, active devices must send a close primitive to the other device. An entire loop delay occurs when one of the devices sends a close primitive that is received by the other device before it sends its close primitive. Once the first device receives the second close primitive then the loop circuit is closed. Per the FC-AL standard, it is not required for the close primitives to be sent in a serial fashion, hence, the close primitives can be traveling the loop at the same time affecting the overall latency.

The following summarizes, the problems with traditional FC-AL implementation:

Problem 1: Large latency in loop communication implementations.

Problem 2: Separate devices to bypass non-working devices add cost to overall system and add jitter to the communication network.

Problem 3: Since only a device needs to know its AL_PA in a conventional standard system, there is no required "system" for determining the AL_PAs used in a loop.

Problem 4: Conventional methodology does not support global arbitration.

Problem 5: All devices on a loop currently need to support a full LPSM, and hence can be expensive.

Problem 6: The open replicate feature of the FC-AL has a long latency on frames sent because all frames need to return to the source device to be removed from the loop.

Therefore, what is required is a process and system that can accelerate frame processing and minimize latency in fibre channel arbitrated loop topology.

SUMMARY OF THE INVENTION

In one aspect of the present invention, a fibre channel switch element is provided. The switch element includes, an acceleration device that connects plural fibre channel devices in an arbitrated loop and monitors frames sent during a loop initialization process and creates an AL_PA table selected by each fibre channel device, wherein the AL_PA table is used for port selection; and during an arbitration process sends a benign primitive to non-arbitrating devices.

During an open process, the acceleration device connects a fibre channel device that wins arbitration to a destination device so that an open primitive can be sent directly to the destination device. Non-destination devices receive a benign primitive during the open process to maintain proper loop state machine state.

During an open replicate process, the acceleration device after it receives an open replicate primitive creates a spray pattern for all ports with which a fibre channel device intends to communicate.

In yet another aspect of the present invention, an acceleration device used by a fibre channel switch element is provided. The acceleration device includes, a global arbitration module, a state machine module, and a matrix for connecting plural fibre channel devices; wherein the acceleration device connects plural fibre channel devices in an arbitrated loop and monitors frames sent during a loop initialization process and creates an AL_PA table selected by each fibre channel device, wherein the AL_PA table is used for port selection; and during an arbitration process sends a benign primitive to non-arbitrating devices.

In yet another aspect of the present invention, a method for accelerating traffic in a fibre channel arbitrated loop topology having a fibre channel switch element with an acceleration device is provided. The method includes, monitoring fibre channel frames during a loop initialization process; creating an AL_PA table for fibre channel devices connected in the arbitrated loop and using the AL_PA table for identifying ports. The method also includes, sending benign primitives to non-arbitrating devices during an arbitration process; connecting a fibre channel device that sends an OPEN primitive to a destination port; and sending a benign primitive to non-destination device connected in the arbitrated loop.

The method also includes creating a spray pattern after receiving an open replicate primitive from a fibre channel device; and sending frames to plural destination ports at the same time.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"Active device": The source device (winning arbitrator) or the destination device.

"Active port": A port with an active device attached to it.

"AL_PA": Arbitrated loop physical address.

"BB_Credit": Buffer-to-Buffer Credit

"FCD": Fibre Channel device

"FC-AL": Fibre channel arbitrated loop process described in FC-AL standard.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"LIP": Loop initialization protocol primitive.

"L_Port": A port that contains Arbitrated Loop functions associated with the Arbitrated Loop topology.

"SES": SCSI Enclosure Services.

"TPE": Transmission Protocol Engine, a controller that operates at the FC-1 level.

To facilitate an understanding of the preferred embodiment, the general architecture and operation of a fibre channel system will be described. The specific architecture and operation of the preferred embodiment will then be described with reference to the general architecture of the fibre channel system.

Figure 1:
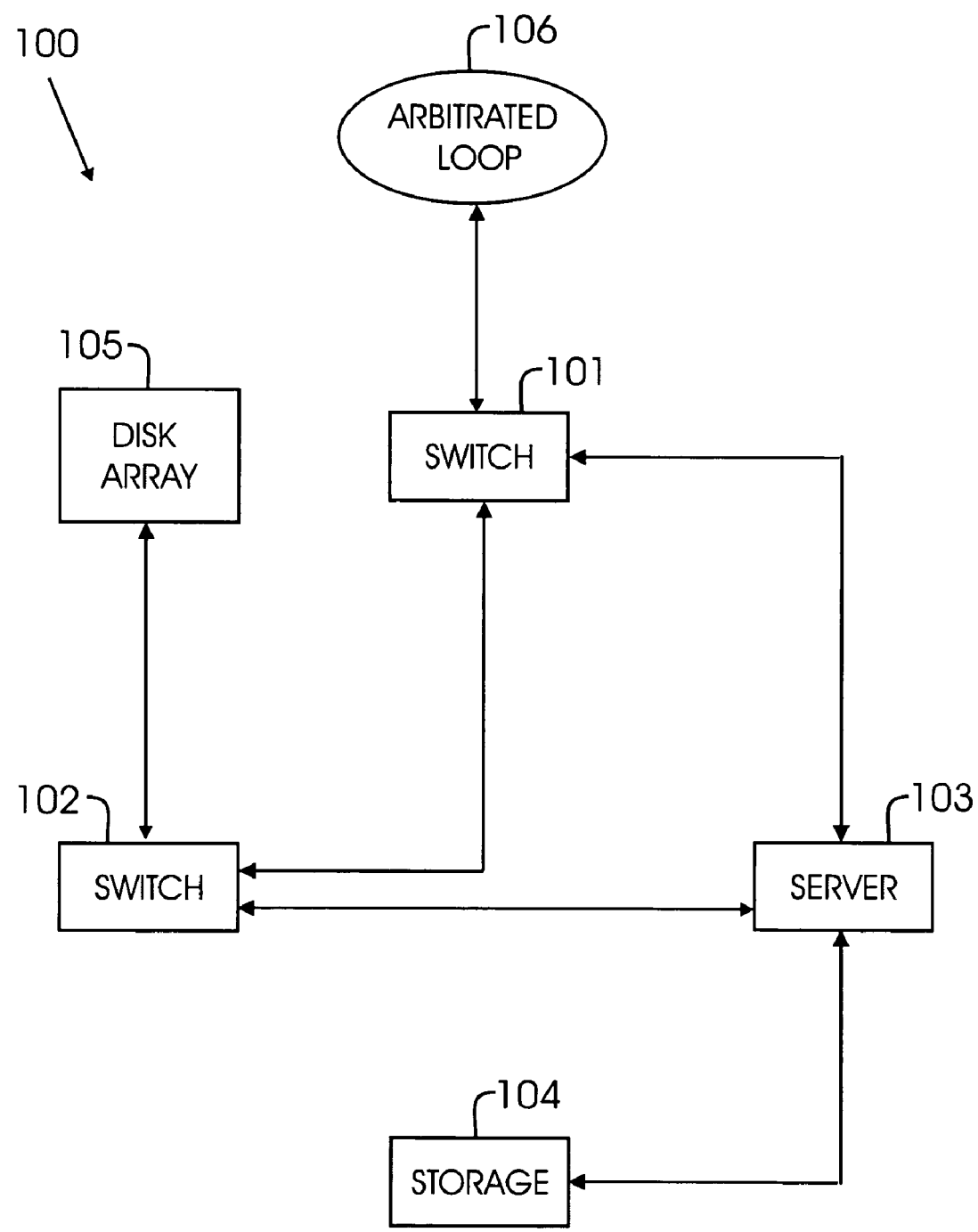
FIG. 1 shows a block diagram of a storage area network.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

In one aspect of the present invention, an acceleration method and system is provided that maintains FC-AL operation while reducing the overall latency as compared to standard FC-AL implementations.

Figure 4:
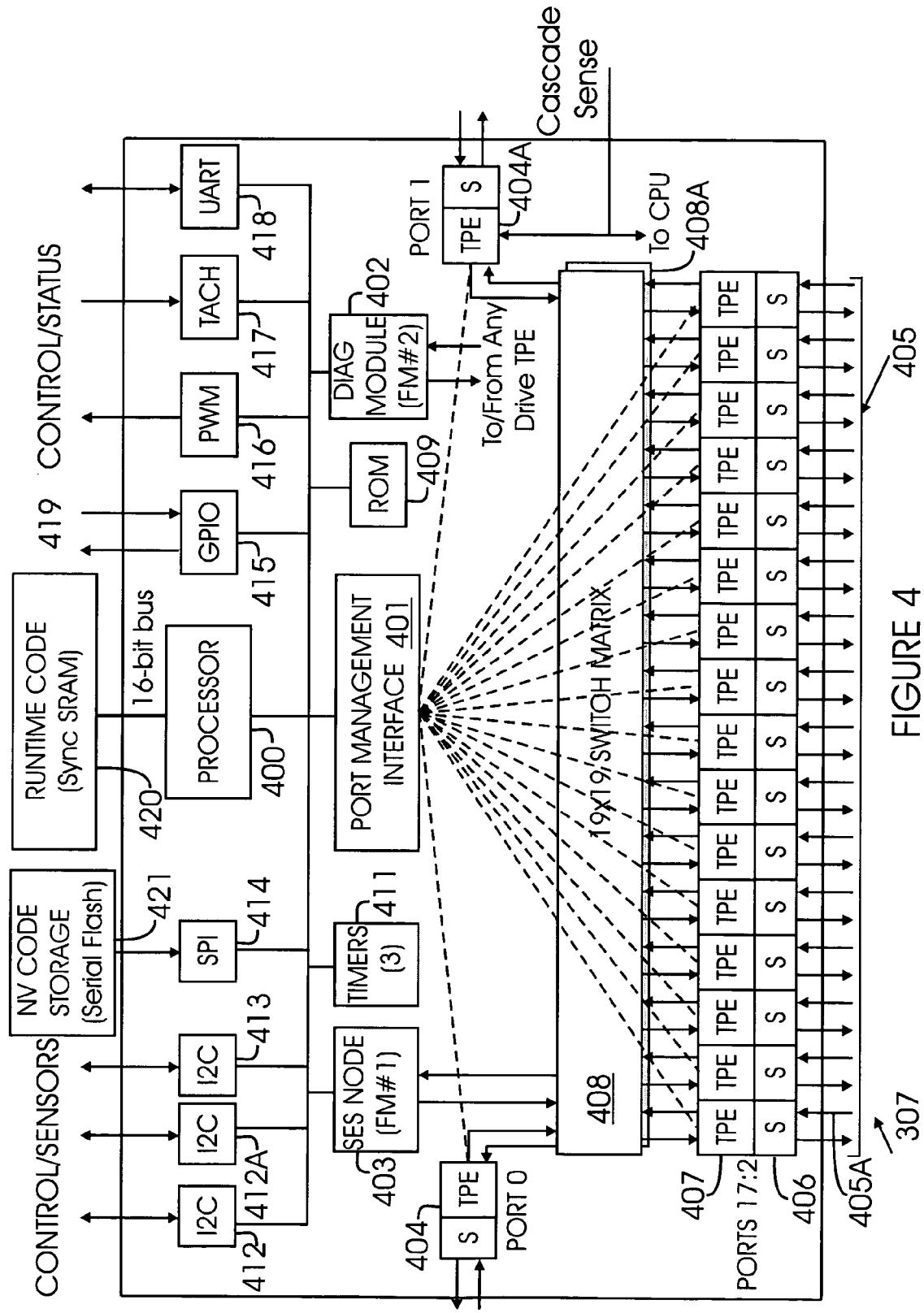
FIG. 4 shows a block diagram of a switch element, according to one aspect of the present invention.

FIG. 4 is a block diagram of an 18-port ASIC FC element 400A (also referred to as system 307) according to one aspect of the present invention. FC element 400A provides various functionality in an FC-AL environment, including without limitation, FC element 400A operates as a loop controller and loop switch using switch matrix 408, in accordance with the FC-AL standard.

FC element 307 of the present invention is presently implemented as a single CMOS ASIC, and for this reason the term "FC element" and ASIC are used interchangeably to refer to the preferred embodiments in this specification. Although FIG. 4 shows 18 ports, the present invention is not limited to any particular number of ports.

System 307 provides a set of port control functions, status indications, and statistics counters for monitoring the health of the loop and attached devices, diagnosing faults, and recovering from errors.

ASIC 307 has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 307 in FIG. 4. However, the ports may be located on any side of ASIC 307. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Figure 3:
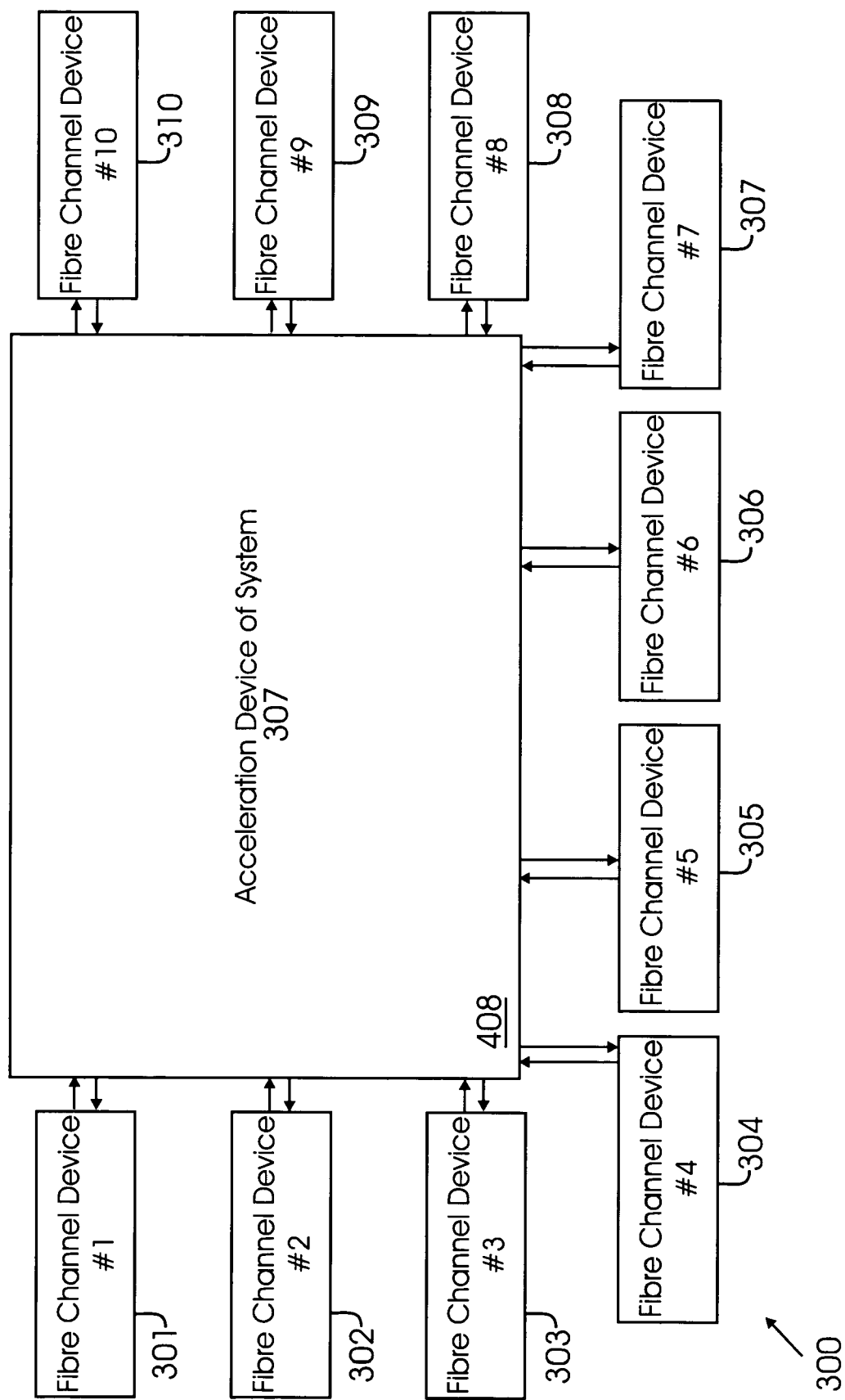

Switch matrix 408 is also referred to as an acceleration device 408 throughout this specification. All transmitters and receivers of all devices are connected to the acceleration device 408, as shown in FIG. 3. Any device that is not operating properly is isolated, which means that acceleration device 408 also acts as a virtual bypass element for each FCD. Each FCD connected to the acceleration device 408 operates in the same fashion as in the traditional implementation, per the FC-AL standard.

Figure 7:
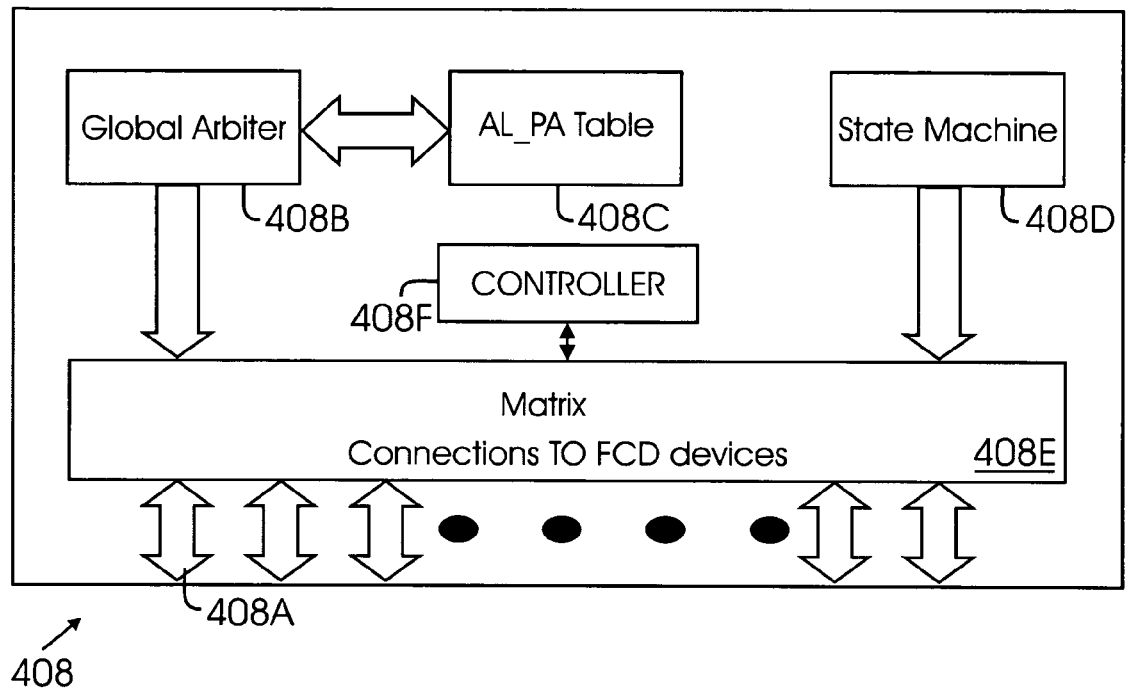
FIG. 7 shows a block diagram of acceleration device, according to one aspect of the present invention.

FIG. 7 shows a block diagram of acceleration device 408 and it includes an AL_PA table 408C, a state machine 408D, a global arbiter 408B, a controller 408F, and data switching paths 408A. Devices are coupled via matrix 408E through connections 408A. State machine 408D states are described belov with respect to FIG. 9.

Global arbiter 408B selects the arbitration winner from all arbitrating channels according to FC-AL rules. For switch channels that request arbitration at a given time, the AL_PA is looked up in table 408C to validate an arbitration request. This is because a switch channel may be repeating an arbitration primitive that it received and may not be requesting arbitration for itself.

Arbiter 408B has a validation and comparison section (not shown). The validation section includes combinatorial logic that validates an arbitration request ("cARBDet") for a given switch channel. The comparison section includes comparators and multiplexers that output the highest arbitrating switch channel.

Controller 408F has three modes of operation, loop mode, spray mode and connection mode. In the loop mode, an isolated switch channel receives data from a previous un-isolated switch channel, however data from the isolated switch channel (or port) is not sent to the loop.

In the spray mode, again an isolated switch channel receives spray elements from a previous un-isolated switch channel, however data from the isolated switch channel (or port) is not sent to the loop. Controller 408F is in spray mode when there is no active traffic for the loop and data is sprayed from a host port to the transmit sections of other switch channels.

In the connection mode, isolated switch channels receive ARB(F0), however data from the isolated switch channel (or port) is not sent to the loop. Controller 408F is in connection mode when there is active traffic for the loop.

Switch matrix 408 provides a quasi-direct architecture in the form of a buffer-less Switch Matrix. Switch matrix 408 includes data multiplexers that provide a path to each port. In one aspect, twenty multiplexers may be used. In one aspect, data is 16 bits wide plus the internal "K" control signal and two parity bits.

At power-up, SGA 408 is setup in a flow-through configuration, which means all ports send what was received on host port 404. When a valid LIP sequence occurs, SGA 408 configures the switch to a complete loop configuration for the address selection process. During normal data transfer on the loop, SGA 408 reconfigures the switch data-path to connect the active ports in what appears as a smaller loop, which lowers the latency but still emulates FC-AL functionality to all entities on the loop.

During loop configuration, SGA 408 configures the switch data-path to include a snooping port that walks through each port during the LIP physical address assignment to track each port's assigned arbitrated loop physical address (AL_PA). This snooping process is called the 'LIP walk'. When the LIP process is done, the firmware records the "port to AL_PA" map in an internal table built in SGA 408. During normal data transfer mode, SGA 408 monitors arbitration requests, open requests, and close primitives to determine which ports have traffic that must be forwarded. The ports that have traffic for the loop provide the necessary information to create the connection points for the switch data-path. The inactive ports are provided the primitive ARB(F0).

SGA 408 selects the arbitration winner, from all the arbitrating ports, according to Fibre Channel Arbitrated Loop (FC-AL) rules. For ports, which detect arbitration, the AL_PA is looked up in a Port Address Table to see if the arbitration request is valid for that port. Due to the unique purpose of port 0 (Host port 404), port 0 never needs to win arbitration, but can detect that the arbitration winner is outside a range, or with ARB(F0)/IDLE show that devices outside system 307 are not arbitrating at a given time.

For arbitration detect on host port 404 to be considered valid the "ArbPS0" cannot match an AL_PA in the internal Port Address Table, which means that the source address is not in a particular system 307. For ports seeking a valid arbitration, the AL_PA determines which arbitrating device has highest priority; and typically, the port with the lowest AL_PA value is always selected as the winner.

SGA 408 creates a direct ioop connection between source and destination devices. This connection methodology avoids the delay associated with data having to pass from one member of the loop to the next until the data has completed traversing the loop. In one aspect, the following formula evaluates performance of a loop connection:

Latency (word times)=n*(2*8)+disk+host=16n+12

Where n is the number of systems 307 that comprise the FC loop, 6 is the latency of the disk drive that is part of the loop connection and 6 is typically the latency of the attached host.

System 307 includes plural I2C (I2C standard compliant) interfaces 412-413 that allow system 307 to couple to plural I2C ports each having a master and slave capability.

System 307 also includes a general-purpose input/output interface ("GPIO") 415. This allows information from system 307 to be analyzed by any device that can use GPIO 415. Control/Status information 419 can be sent or received through module 415. Timer module 411 is provided to control various timer operations.

System 307 also includes a SPI module 414 that is used for parallel to serial and serial to parallel transfer between processor 400 firmware and flash memory 421 in the standard Little Endian format.

System 307 also includes a Universal Asynchronous Receiver/Transmitter ("UART") interface 418 that converts serial data to parallel data (for example, from a peripheral device modem or data set) and vice-versa (data received from processor 400) complying industry standard requirements.

System 307 can also process tachometer inputs (received from a fan, not shown) using module 417. Processor 400 can read the tachometer input via a tachometer rate register and status register (not shown).

System 307 provides pulse width modulator ("PWM") outputs via module 416. Processor 400 can program plural outputs.

System 307 also includes two frame manager modules 402 and 403 that are similar in structure. Processor 400 can access runtime code from memory 420 and input/output instructions from read only memory 409.

Module 402 (also referred to as the "diag module 402") is a diagnostic module used to transfer diagnostic information between a FC-AL and the firmware of system 307.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintain the current fill word.

Based on a current LPSM 615 state (OPEN or OPENED State), modules 402 and 403 receive frames, pass the frame onto a buffer, and alert firmware that a frame has been received. Module 402 and 403 follow FC-AL buffer to buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

Figure 5A:
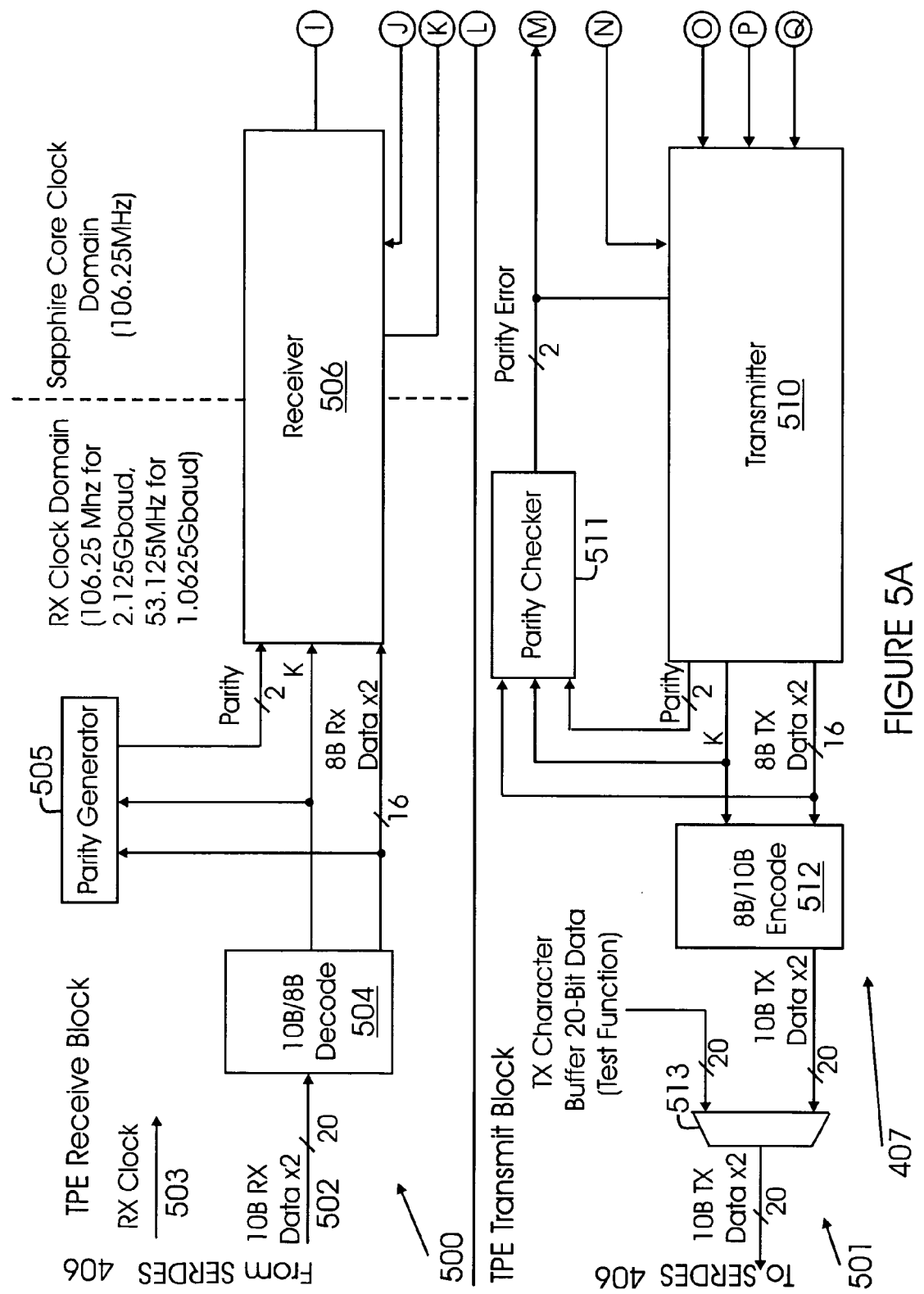
FIGS. 5A and 5B (jointly referred to as FIG. 5) show a block diagram of a transmission protocol engine, according to one aspect of the present invention.
Figure 5B:
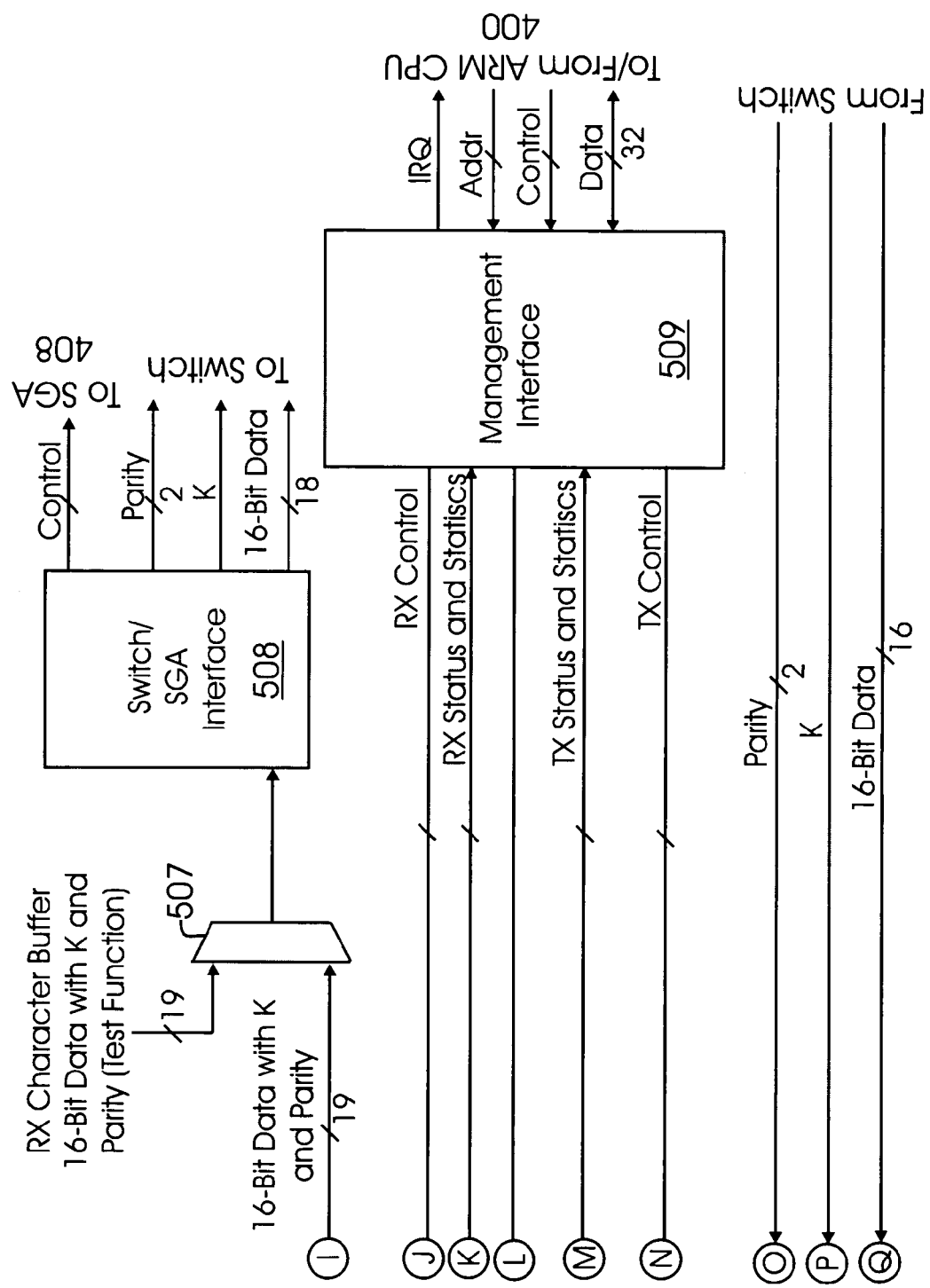

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Figure 6A:
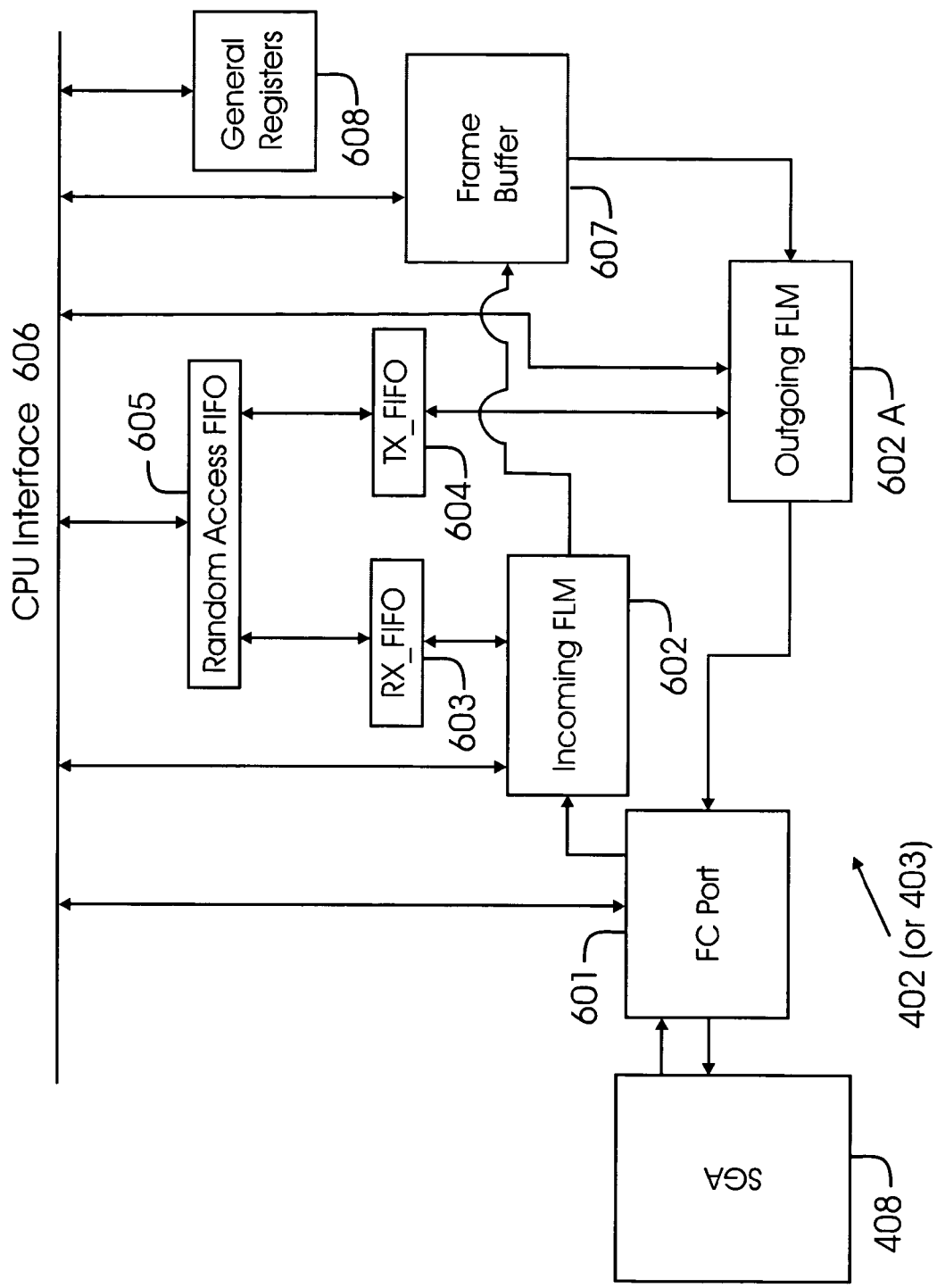
FIGS. 6A and 6B show block diagrams for a diagnostic module and a SES module, according to one aspect of the present invention.
Figure 6B:
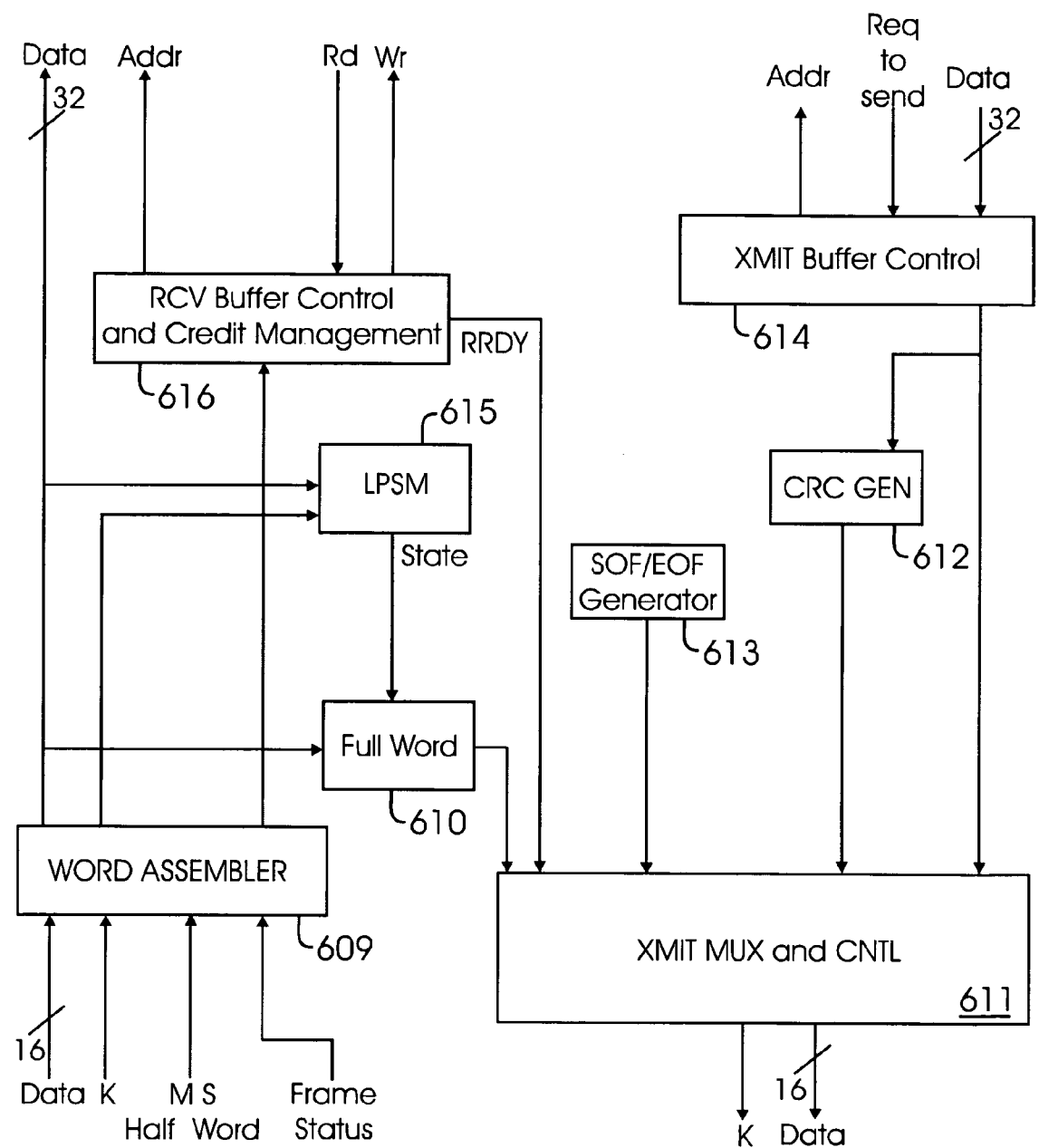

FIGS. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle RX_FIFO, ("FIFO") 603 and transmit side TX_FIFO FIFO 604 interfacing with a Random access FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. On request, modules 402 and 403 may automatically generate SOF and EOF during frame transmission (using module 613). On request, modules 402 and 403 may also automatically calculate the Cyclic Redundancy Code (CRC) during frame transmission, using module 612.

Overall transmission control is performed by module 611 that receives data, SOF, EOF and CRC. Transmit Buffer control is performed by module 614. A word assembler module 609 is used to assemble incoming words, and a fill word module 610 receives data "words" before sending it to module 611 for transmission.

FIG. 5 shows a block diagram of the transmission protocol engine ("TPE") 407. TPE 407 maintains plural counters/registers to interact with drives coupled to ports 405. Each TPE 407 interacts with processor 400 via port manager interface 401.

Each Fibre Channel port of system 400A includes a TPE module for interfacing with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507) receives information from a receiver module 506 that receives decoded data from decode module 504 and parity data from module 505.

Management interfaces module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

Port Management Interface (PMIF) 401 allows processor 400 access to various port level registers, SerDes modules 406 and TPE Management Interfaces 509 (MIFs). PMIF 401 contains a set of global control and status registers, receive and transmit test buffers, and three Serial Control Interface (SCIF) controllers (not shown) for accessing SerDes 406 registers.

The following provides a description of various standard FC-AL processes that are accelerated, using system 307 (and acceleration device 408), according to one aspect of the present invention (also referred to as the "accelerated implementation").

LIP Process: During the LIP process, acceleration device 408 connects all devices as if they were in a loop and the devices behave as in the traditional implementation. In one aspect of the present invention, acceleration device 408 monitors the frames sent during the LIP process to determine the AL_PAs selected by each FCD. A FC-AL compliant entity advances through the loop to intercept the initialization frames from each device for processing before passing them on to the next device. This retrieves the AL_PA selected by each device and creates a table for the AL_PAs of the FCDs connected to system 307. The AL-PA table 408C is then used for identification purposes for port selection.

Arbitration process: In the accelerated implementation (i.e. with acceleration device 408) when the loop is idle, "host" port 404 sends data to all the connected FCDs. When only one device wants access to the loop, the global arbiter 408B connects "host" port 404 to the FCD arbitrating and then connects this FCD back to the "host" port 404. The other FCDs receive a benign primitive, so if they desire to access the loop they can start the arbitration process just as they would in a traditional implementation.

Global arbiter 408B follows the FC-AL rules for arbitration and changes the winning port if a higher priority port starts arbitrating before any existing arbiter has won arbitration, just as in the traditional implementation.

In the accelerated implementation, only the arbitrating and "host" port 404 are connected to the loop. Thus, the delay to retrieve the arbitration primitive (win arbitration) is two re-timing delays, one in the acceleration device 408 and the other through the FCD on the host port 404. If the device on host port 404 is the arbitrating device then the delay is one re-timing delay through the acceleration device.

Open process: In the accelerated implementation (i.e. with acceleration device 408) when the winning FCD sends out an open primitive, the acceleration device 408 connects the destination FCD to the winning FCD, looping through host port 404, and the open primitive is directly passed to the destination FCD. The destination FCD can then send the R_RDY primitive, which travels through the acceleration device 408 and the FCD on the host port 404. The other FCDs receive a benign primitive to maintain the proper LPSM state in those devices. In this case, the latency is three re-timing delays, due to the open primitive, the R_RDY primitive and the delay of the FCD on the host port 404.

If the destination port is upstream of the winning port, there are three re-timing delays, two due to the open primitive and one due to the R_RDY primitive. However, if one of the ports is host port 404, then there is only two re-timing delays through the acceleration device 408.

Open replicate process: In the accelerated implementation (i.e. using acceleration device 408) to complete the loop circuit, the winning FCD can send an open replicate primitive(s). The winning FCD can do a broadcast open replicate or a specific open replicate and the acceleration device 408 responds in a similar manner. When the acceleration device 408 sees the open replicate, it creates a spray pattern that includes the FCDs ports that a source (the winning FCD) port wants to communicate with. The frames are sent to all ports at the same time and then returned to the source for removal from the loop, as per the FC-AL standard. Latency is reduced by the frames arriving at all ports at the same time instead of traveling around the entire loop.

Close process: In the accelerated implementation (i.e. using acceleration device 408) since only the active devices are connected there is only re-timing and host port 404 delay to close the circuit.

Figure 9A:
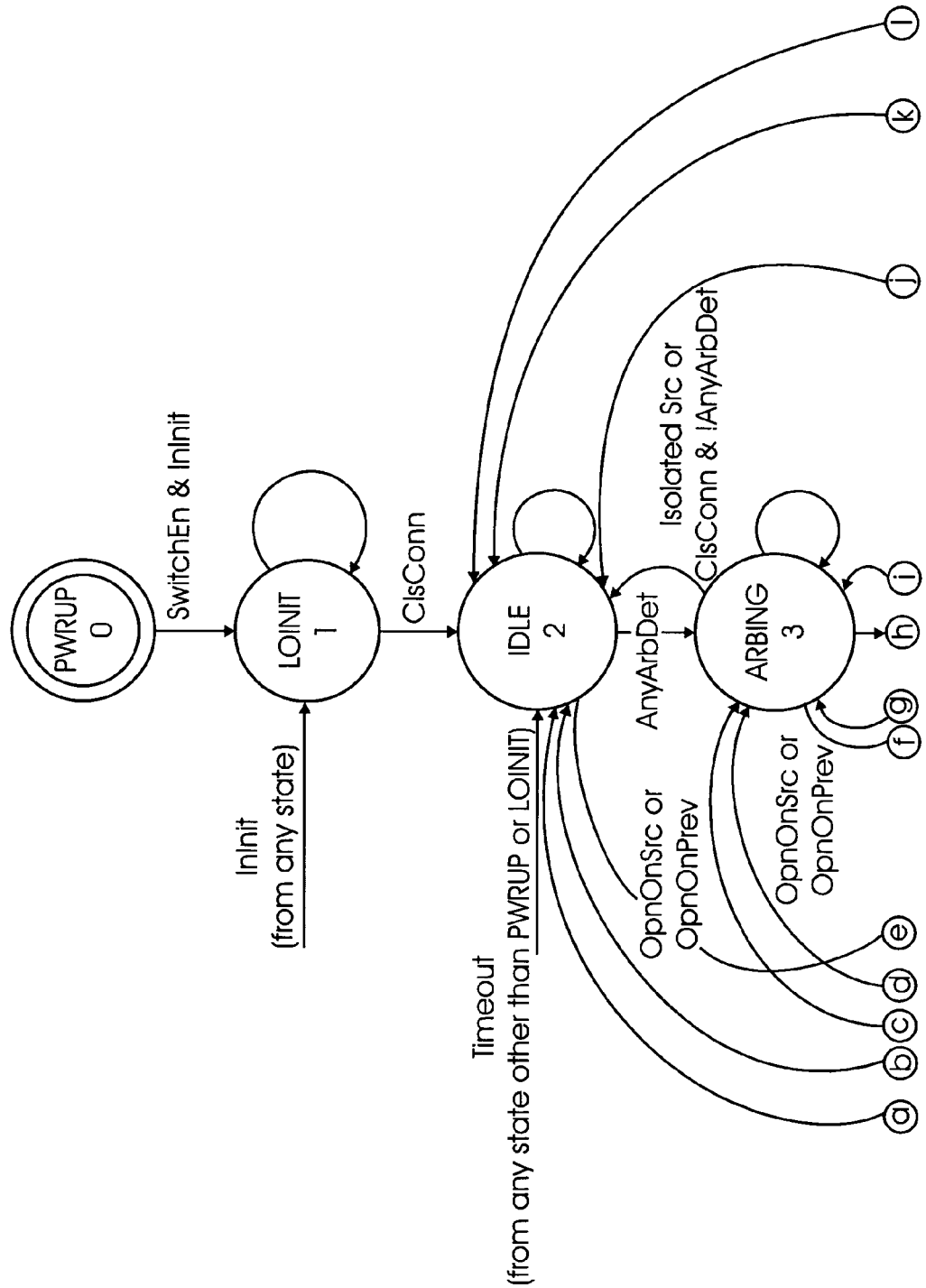
FIGS. 9A and 9B show a state machine for the acceleration device, according to one aspect of the present invention.
Figure 9B:
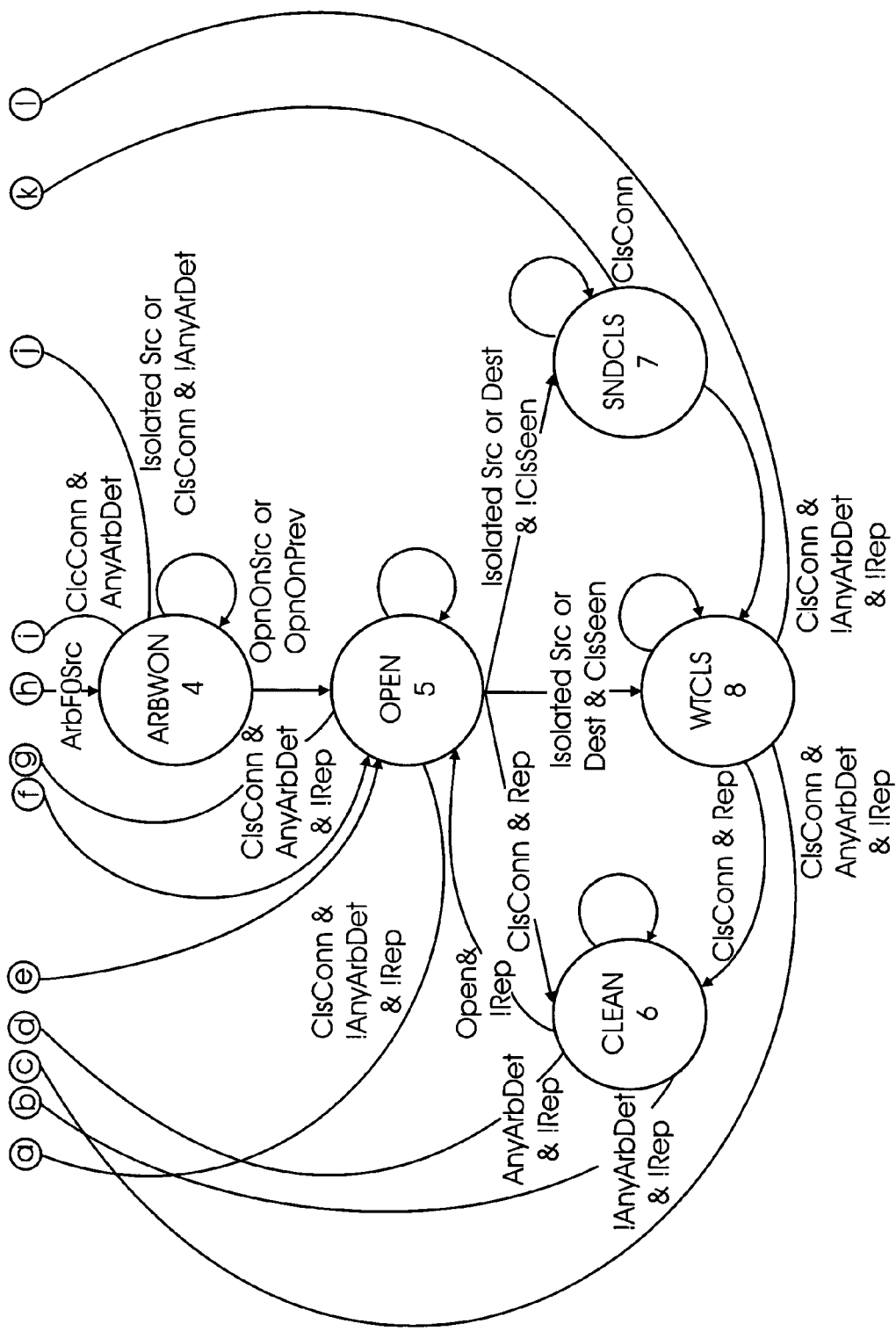

State Machine: In the accelerated implementation (i.e. using acceleration device 408), all FCDs connected to the acceleration device 408 need a LPSM as in the traditional implementation. However, acceleration device 408, only requires a state machine (408D) that describes the state of the loop, not individual loop ports. This simplified state machine is not a part of the current FC-AL standard. FIG. 9 (i.e. FIGS. 9A and 9B) shows a state machine diagram for acceleration device 408, according to one aspect of the present invention.

FIG. 9 shows eight basic states for state machine 408D. Table I below describes the basic eight states:

| State | Description |
| --- | --- |
| PWRUP State 0 | The power up state is the hardware reset state. TPE 407 uses this time for speed negotiation, before it allows a valid LIP to be indicated to the SGA 408. The only way to exit this state is to have both the Switch Enable bit set and a valid LIP indication. The Switch Enable bit is only evaluated in this state and is set by firmware of system 307. |
| LOINIT State 1 | This state is used to put the switch (307) in the loop configuration and to process LISM and Lix A frames. The first switch channel to indicate ARB (F0) during the LISM processing is the Loop Initialization Master (LIM). The Lix A frames are snooped at each switch channel by walking the Diagnostics port 402 through all unisolated switch channels. Firmware is responsible for advancing the Diagnostics port 402. |
| IDLE State 2 | This state is used when there is no traffic on the loop. The switch (307) is set in a single spray configuration where the source of the spray is the Host Port 404. |
| ARBING State 3 | This state is used to connect the highest arbitrating switch channel to the loop and stays here until the switch channel arbitrating recognizes that it has won arbitration. |
| ARB WON State 4 | This state is used to wait for an open primitive once an arbitrating switch channel has declared it has won arbitration. |
| OPEN State 5 | This state indicates that an OPEN (OPN) connection exists. |
| CLEAN State 6 | This state is used to clear up all retransmitted closes after Replicated Open. |
| SNDCLS State 7 | This state is used to send a close primitive for a connection switch channel that was isolated before it sent a Close (CLS) primitive itself. |
| WTCLS State 8 | This state is used to wait out the completion of a connection where one of the connection switch channels was isolated. |

Table II below shows the various State Machine 408D transitions, according to one aspect of the present invention:

| Current State | Next State | Reason for Transition |
| --- | --- | --- |
| PWRUP | PWRUP | When reset occurs, the state machine 408D stays in this state to indicate to the Switch Controller 408F that it should be in default single spray mode. To leave this state is to have a valid LIP occur with the Switch Enable bit set. Loop traffic should NOT be considered reliable until LIPs occur. |
| PWRUP | LOINIT | When switch 307 is enabled and a valid LIP occurs, the state machine 408 changes to the loop initialization state. Loop traffic at this instance is LIP primitives. |
| Any State | LOINIT | When a valid LIP occurs in any state, the state machine 408D transitions to the loop initialization state and loop traffic is LIP primitives. |
| LOINIT | LOINIT | State machine 408D stays in this state until the LIP process has completed. The LOINIT state indicates to the Switch Controller 408F that it should be in loop mode. In loop mode, firmware advances port 402 for snooping AL_PA assignments. Loop traffic consists of LISM and LIxA frames. |
| LOINIT | IDLE | This transition occurs when the CLS primitive for the LIP process is seen. Only one CLS primitive is used for the LIP process. Loop traffic is CLS and idle primitives. |
| IDLE | IDLE | When none of the switch channels require active connections to the loop, the state machine 408D stays in the idle state. Loop traffic is idle and possibly link primitives. |
| IDLE | ARBING | Whenever any switch channel indicates that arbitration primitive has been seen, the state machine 408D changes to the arbitrating state. The Switch Controller 408F makes the winning switch channel, according to the Arbiter module 408B, the source connection for loop traffic and the loop traffic is arbitration primitives. |
| IDLE | OPEN | Whenever an open primitive has been seen on a previous source port, the state machine 408D changes to the open state. The Switch Controller 408F makes the source of the open primitive to be the current source and the destination of the open primitive to be the destination connection point. Loop traffic is open and idle primitives. |
| ARBING | ARBING | While a winner is being selected, according to FC-AL protocol a port receives back it's own arbitration primitive to win arbitration, hence, the state machine 408D stays in the arbitrating state. The SrcPN primitive can change during this state and loop traffic is arbitration primitives. |
| ARBING | ARBWON | When the source switch channel issues an ARB(F0) primitive the state machine 408D changes to the arbitration won state. Loop traffic is arbitration primitives. |
| ARBING | OPEN | When an open primitive is seen on the source switch channel, the |

-continued

| Current State | Next State | Reason for Transition |
|---|---|---|
| | | state machine 408D changes to the open state. The Switch Controller 408F makes the destination of the OPN as the destination connection for the loop. Loop traffic is OPN, arbitration and idle primitives. |
| ARBING | IDLE | When the source switch channel is isolated or when a close connection is seen and there are no other switch channels arbitrating, the state machine 408D returns to the idle state. |
| ARBWON | ARBWON | Waiting for an open primitive from the source connection, the state machine 408D stays in the arbitration won state. |
| ARBWON | OPEN | When an open primitive is seen on the source switch channel, the state machine 408D changes to the open state. The Switch Controller 408F makes the destination of the OPN as the destination connection for the loop. Loop traffic is OPN, arbitration and idle primitives. |
| ARBWON | ARBING | When a close connection is seen and there are other switch channels arbitrating, the state machine 408D changes to the arbitrating state. |
| ARBWON | IDLE | When the source switch channel is isolated or when a close connection is seen and there are no other switch channels arbitrating, the state machine 408D returns to the idle state. |
| OPEN | OPEN | While there is an open connection, the state machine 408D stays in the open state. Loop traffic is frames, R_RDYs, idle or arbitration primitives. |
| OPEN | ARBING | When a close connection is seen and there are other switch channels arbitrating and the previous connection was not a replicate spray, the state machine 408D changes to the arbitrating state. Loop traffic is arbitration primitives. |
| OPEN | IDLE | When a close connection is seen and there are no other switch channels arbitrating and the previous connection was not a replicate spray, the state machine 408D changes to the idle state. Loop traffic is idle primitives. |
| OPEN | CLEAN | When a close connection is seen and the previous connection was a replicate spray, the state machine 408D changes to the clean state. Loop traffic is idle or arbitration primitives. |
| OPEN | SNDCLS | When one of the switch channels is isolated and the CLS was not seen for that connection point, the state machine 408D changes to the send close state ("SNDCLS"). Loop traffic is frames and idle or arbitration primitives. |
| OPEN | WTCLS | When one of the connection switch channels is isolated and the close was seen for that connection point, the state machine 408D changes to the wait close state ("WTCLS"). Loop traffic is frames and idle or arbitration primitives. |
| CLEAN | CLEAN | While the switch channels that were part of the replicate spray are retransmitting the close primitive, the state machine 408D stays in the clean state. Loop traffic is idle or arbitration primitives. |
| CLEAN | ARBING | When the switch channels that were part of the replicate spray have completed retransmitting the close primitive and there is another switch channel arbitrating, the state machine 408D changes to the arbitrating state. Loop traffic is arbitration primitives. |
| CLEAN | IDLE | When the switch channels that were part of the replicate spray have completed retransmitting the close primitive and there is no other switch channel arbitrating, the state machine 408D changes to the idle state. Loop traffic is idle primitives. |
| CLEAN | OPEN | When the switch channels that were part of the replicate spray have completed retransmitting the close primitive and there is an open primitive, the state machine 408D changes to the open state. Loop traffic is open, arbitration or idle primitives. |
| SNDCLS | SNDCLS | Until the correct phase of MsHalfWord and cDataEn occur, the state machine 408D stays in the send close state. Loop traffic is close, idle or arbitration primitives or frames. |
| SNDCLS | WTCLS | When there is no connection timeout at a next clock edge on the correct phase of MsHalfWord and cDataEn, the state machine 408D changes to the wait close state. Loop traffic is close, idle or arbitration primitives or frames. |
| SNDCLS | IDLE | When there is a connection timeout at the next clock edge on the correct phase of MsHalfWord and cDataEn, the state machine 408D changes to the idle state. Loop traffic is close, idle or arbitration primitives or frames. |
| WTCLS | WTCLS | While the connection is completing after one of the connection points is isolated, the state machine 408D stays in the wait close state. Loop traffic is close, idle or arbitration primitives. |
| WTCLS | CLEAN | When there is a close connection and the previous connection was a replicated spray, the state machine 408D changes to the clean state. Loop traffic is close, idle or arbitration primitives. |
| WTCLS | ARBING | When there is a close connection and there is another switch channel arbitrating, the state machine 408D changes to the arbitrating state. Loop traffic is close, and arbitration primitives. |
| WTCLS | IDLE | When there is a close connection and there is no other switch channel arbitrating, the state machine 408D changes to the idle state. Loop traffic is close, and idle primitives. |
| Any state except PWRUP | IDLE | When a connection timeout timer expires, the state machine 408D changes to the idle state. The timeout indicates that the switch |

-continued

| Current State | Next State | Reason for Transition |
|---|---|---|
| or LOINIT | | may be out of sync with the loop traffic or that an active switch channel did not follow protocol and needs to be removed as an active connection. Loop traffic could be anything at this time. |

Figure 2:
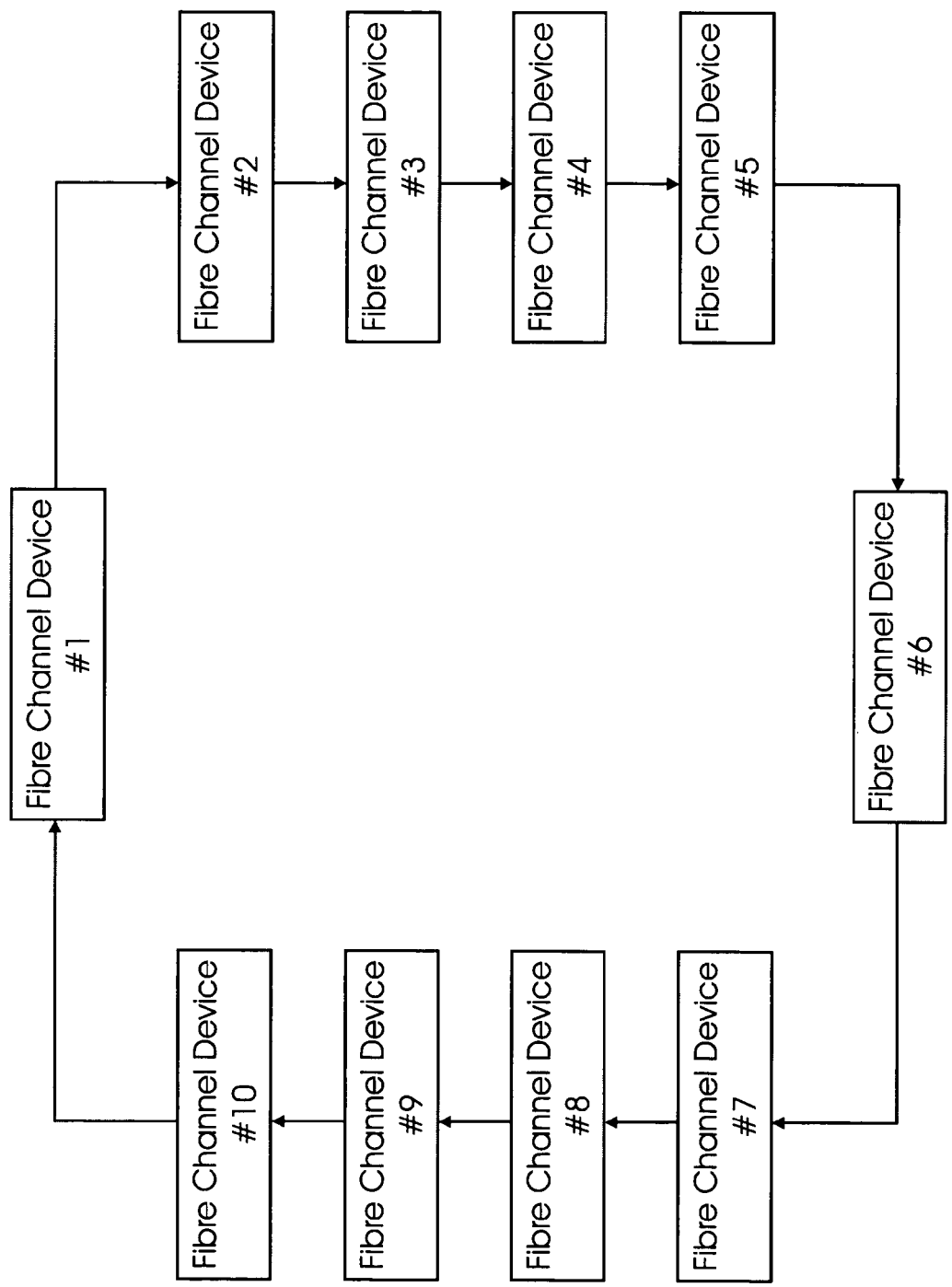
FIGS. 2 and 3 show configurations that use the adaptive aspects of the present invention.

Reducing Latency in the "Small Example" Case:

The following illustrates how the present invention minimizes latency in a "small example" case, i.e., where the number of FCD is small, as shown in FIGS. 2 and 3. In FIG. 3 the fibre channel devices are numbered as 301-310 for clarification only, since the fibre channel devices are the same as in FIG. 2. Referring to FIGS. 2 and 3, if FCD #1 wants to send frames to FCD #7, then FCD #1 creates the loop circuit, sends the frames and closes the loop circuit. The following calculations show the difference in latency between traditional and the accelerated implementation. Table III below also provides a comparison between the traditional implementation and the accelerated implementation, according to the present invention:

Arbitration process: In the traditional implementation, the arbitration primitive ("ARB") passes through all devices on the loop. In the above example, FCD #1 sends the arbitration primitive to FCD #2, which processes this primitive and sends it to FCD #3 and so on until the primitive is sent to FCD #1. The cumulative latency is based on the latency for all devices except #1. If the latency is the same for each device, such as the maximum latency in monitoring mode per the FC-AL standard then the "Total Latency" (latency)(n-1) where n is the number of devices connected to the loop. Thus in the above example Total Latency=(6 transmission word times) (10-1)=54 transmission word times, "word" is a unit for frame (or date) transmission. It is noteworthy that the various adaptive aspects of the present invention are not limited to any particular unit for frame/date transmission.

In the accelerated implementation, according to the present invention, the arbitration primitive is sent to the acceleration device 408 and then looped around. If the arbitrating device is not on host port 404 it takes two re-timing delays to pass from FCD #1 back to FCD #1. If the arbitrating device is on the host port 404, it takes one re-timing delay to pass from FCD #1 back to FCD #1. Hence according to the present invention, the latency will be 16 and 8 transmission word times, respectively, instead of 54 transmission word times in the traditional implementation.

Open process: In the traditional implementation, the open primitive passes through all devices between FCD #1 and FCD #7.

Thus Total Latency=(latency)(m) where m is the number of devices between the two active devices.

In the above example there are 5 devices between the two active devices (FCD #2, #3, #4, #5, #6) and hence, the Total Latency=(6 transmission word times)(5)=30 transmission word times. Thereafter, FCD #7 sends an R_RDY primitive back to FCD #1, which has the same equation for Total Latency.

In the above example there are 3 devices between the two active devices (FCD #8, #9, #10) and the Total Latency=(6 transmission word times)(3)=18 transmission word times. Hence the total latency for the complete open process is 30+18=48 transmission word times.

In the accelerated implementation, according to the present invention, the open primitive is sent to acceleration device 408 and then sent to FCD #7. The total latency is one re-timing delay to pass through the acceleration device 408, which will be 8 transmission word times. Then FCD #7 sends an R_RDY primitive back to FCD #1, which has the same Total Latency, i.e., 8 transmission word times. The total latency for complete open process is 8+8=16 transmission word times, instead of 48 transmission word times in the traditional implementation.

If neither of the active devices is on host port 404, there is another re-timing delay to complete the loop causing the Total Latency to be equal to 24 transmission word times.

Frame process: In the traditional implementation, frames pass through all devices between FCD #1 and FCD #7. The Total Latency=(latency)(m), where m is the number of devices between the two active devices. In the above example there are 5 devices between the two active devices (FCD #2, #3, #4, #5, #6), hence, the Total Latency=(6 transmission word times)(5)=30 transmission word times.

The frames from FCD #7 to FCD #1 have the same equation for Total Latency. In the above example there are 3 devices between the two active devices (FCD #8, #9, #10) and the Total Latency=(6 transmission word times)(3)=18 transmission word times.

In a loop circuit created by an open replicate primitive the frame sent by the source travels the entire loop and then removed by the source device. The Total Latency=(latency) (n−1)=(6 transmission word times)(9)=54 transmission word times.

In the accelerated implementation, according to the present invention, the frames from FCD #1 to FCD #7 are sent to the acceleration device 408 and then sent to FCD #7. The total latency is one re-timing delay to pass through the acceleration device, which is 8 transmission word times. The frames from FCD #7 to FCD #1 have the same Total Latency, i.e. 8 transmission word times. Hence, the total latency is 16 transmission word times, instead of 48 transmission word times in the traditional implementation.

In a loop circuit created by an open replicate primitive the frame sent by the source is sent to all necessary devices at the same time and then returned to the source to be removed. The total latency is two re-timing delays, which is 16 transmission word times, instead of 54 transmission word times in the traditional implementation.

If one of the active devices is not on host port 404 another re-timing delay is added, thus total latency=24 transmission word times.

Close process: The closing of a loop circuit is similar to opening a loop circuit, except that the two active devices can send their close primitives at the same time. In the worst case scenario, the difference in latency between the two implementations is the same as the open process. In the best case scenario, the two active devices have the same number of devices between them on both paths and both devices send their closes at the same time.

In this case for the traditional implementation the Total Latency=(latency)(n/2−1)=(6 transmission word times)(10/2−1)=24 transmission word times.

For the accelerated implementation, according to the present invention, the total latency is two or three re-timing delays (two if the host port has one of the active devices), i.e. 16 or 24 transmission word times.

TABLE III

Comparison of Latency in a Small Example Case

| Latency Type | Traditional | Accelerated Implementation/ Host an active port | Accelerated Implementation/ Host NOT an active port |
|---|---|---|---|
| Arbitration | 54 | 8 | 16 |
| Open | 48 | 16 | 24 |
| Frame FCD #1 to FCD #7 | 30 | 8 | 8/16 |
| Frame FCD #7 to FCD #1 | 18 | 8 | 16/8 |
| Frames back and forth (total) | 48 | 16 | 24 |
| Frame Open Replicate | 54 | 16 | 24 |
| Close | 24 | 16 | 24 |

Figure 8:
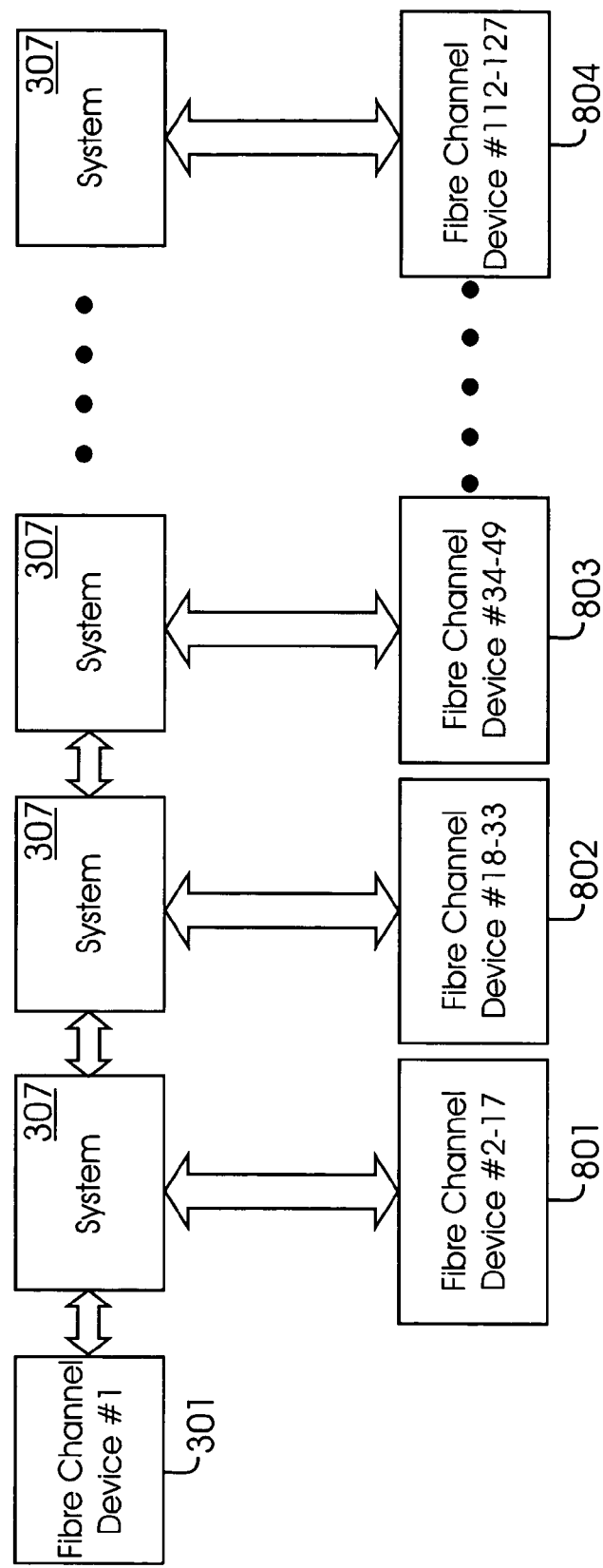
FIG. 8 shows an example of how plural fibre channel switch elements may be used to couple 127 fibre channel devices, according to one aspect of the present invention.

Reducing Latency in the "Maximum Example" Case:

FC-AL standard allows for a maximum of 127 devices on a loop. All 127 FCDs could be connected to one acceleration device 408 or plural system 307 may be used to operationally/functionally couple 127 devices. In one aspect, 17 FCDs may be coupled to system 307 via acceleration device 408. To get a greater number of devices connected, system 307 be cascaded together such that the cascade port 404A of the first system 307 is connected to the host port 404 of the second system 307 and so on. FIG. 8 shows an example of how plural system 307 may be used to couple 127FCDs (the "Maximum Case" shown as devices 801-804).

The following provides a comparison (including Table IV) between traditional and the accelerated implementation latency, according to the present invention in the Maximum Example Case.

Arbitration process: In the traditional implementation, the arbitration primitive passes through all devices on the loop. In the above example, FCD #1 sends out the arbitration primitive to FCD #2 that processes this primitive and sends to FCD #3 and so on, until the primitive is sent to FCD #1. The total latency is due to the latency in all devices except #1. If the latency is the same for each device, such as the maximum latency in monitoring mode per the FC-AL standard then, Total Latency=(latency)(n−1) where n is the number of devices connected to the loop. Thus in the above example Total Latency=(6 transmission word times)(127−1)=756 transmission word times.

In the accelerated implementation, the arbitration primitive is sent to the acceleration devices 408 and then looped around. In one aspect, the arbitration primitive is sent to each acceleration device and then looped back. If FCD #1 sends the arbitration primitive then there will be one retiming delay to go through cascade port 404A and then so on through all acceleration devices 408 except the last, which will just take one retiming delay to loop the arbitration primitive back through host port 404. There is a re-timing delay to get the arbitration primitive from the cascade port 404A to host port 404 and so on through plural system 307. Total Latency=(2)(latency)(n−1)+latency=(2)(8 transmission word times)(8)+(8 transmission word times)=136 transmission word times, instead of the traditional 756 transmission word times.

If neither of the active devices is on host port 404 there is another retiming delay to complete the loop causing the Total Latency to be equal to 144 transmission word times.

Open process: In the traditional implementation, the open primitive passes through all devices between FCD #1 and FCD #7. Thus Total Latency=(latency)(m) where m is the number of devices between the two active devices. In the above example there are 5 devices between the two active devices (FCD #2, #3, #4, #5, #6) and the Total Latency=(6 transmission word times)(5)=30 transmission word times. Then FCD #7 will send an R_RDY primitive back to FCD #1, which has the same equation for Total Latency. In the above example there are 120 devices between the two active devices (FCD #8, #9, #10 . . . #127) and the Total Latency=(6 transmission word times)(120)=720 transmission word times. The complete open process is 30+720=750 transmission word times.

In the accelerated implementation, the open primitive is sent to the acceleration device 408 and then sent to FCD #7. The total latency is one retiming delay to pass through the acceleration device 408. This would be 8 transmission word times. Then FCD #7 will send an R_RDY primitive back to FCD #1, which has the Total Latency required to pass through all acceleration devices 408 and loop back to FCD #1, which is 136 transmission word times. The complete open process takes 8+136=144 transmission word times, instead of 750 transmission word times in the traditional implementation.

If neither of the active devices is on host port 404 there is another retiming delay to complete the loop causing the Total Latency to be equal to 152 transmission word times.

Frame process: In the traditional implementation, the frames pass through all devices between FCD #1 and FCD #7. Thus Total Latency=(latency)(m) where m is the number of devices in between the two active devices. In the above example there are 5 devices between the two active devices (FCD #2, #3, #4, #5, #6) and the Total Latency=(6 transmission word times)(5)=30 transmission word times. The frames from FCD #7 to FCD #1 have the same equation for Total Latency. In the above example there are 120 devices between the two active devices (FCD #8, #9, #10 . . . #127) and the Total Latency=(6 transmission word times)(120)=720 transmission word times.

In a loop circuit created by an open replicate primitive the frame sent by the source will travel the entire loop and then be removed by the source device. The Total Latency=(latency)(n−1)=(6 transmission word times)(126)=756 transmission word times.

In the accelerated implementation, the frames are sent to acceleration device 408 and then sent to FCD #7. The total latency is one retiming delay to pass through the acceleration device. This would be 8 transmission word times. The frames from FCD #7 to FCD #1 have the Total Latency of passing through each acceleration device and then looping back, which is 136 transmission word times, according to one aspect of the present invention, instead of 720 transmission word times in the traditional implementation.

In a loop circuit created by an open replicate primitive, the frame sent by the source is sent to all necessary devices at the same time and then returned to the source to be removed. The total latency is one extra retiming delay, which is 144 transmission word times, according to the present invention, instead of 756 transmission word times in the traditional implementation.

If one of the active devices is not on the host port another retiming delay is added, thus total latency=152 transmission word times.

Close process: The closing of a loop circuit is similar to opening a loop circuit, except the two active devices can send their close primitives at the same time. In the worst case scenario, the difference in latency between the two implementations is the same as the open process.

In the best case scenario, the two active devices have the same number of devices between them on both paths and both devices send their "closes" at the same time. In this case for the traditional implementation the Total Latency=(latency)(n/2-1)=(6 transmission word times)(127/2-1)=378 transmission word times.

For the accelerated implementation the total latency is half the total latency of the acceleration devices, 144/2=72 transmission word times, when both devices are sending close at the same time and the devices are half way around the loop from each other.

TABLE IV

Comparison of Latency in the Maximum Example Case

| Latency Type | Traditional implementation | Accelerated Implementation/ Host an active port | Accelerated Implementation/ Host NOT an active port |
|---|---|---|---|
| Arbitration | 756 | 136 | 144 |
| Open | 750 | 144 | 152 |
| Frame FCD #1 to FCD #7 | 30 | 8 | 16 |
| Frame FCD #7 to FCD #1 | 720 | 136 | 144 |
| Frames back and forth (total) | 750 | 144 | 152 |
| Frame Open Replicate | 756 | 152 | 160 |
| Close | 378 | 72 | 80 |

Although the present invention has been described with reference to specific embodiments, these embodiments are illustrative only and not limiting. Many other applications and embodiments of the present invention will be apparent in light of this disclosure and the following claims.

What is claimed is:

1. A fibre channel switch element, comprising:
   an acceleration device that (a) connects a plurality of fibre channel devices in an arbitrated loop; (b) monitors frames sent by of the plurality of fibre channel devices during a loop initialization process to determine an arbitrated loop physical address (AL_PA) value selected by each of the plurality of fibre channel devices; (c) creates an AL_PA table based on the AL_PA values selected by each of the plurality of fibre channel devices, wherein the AL_PA table is stored in the acceleration device and the AL_PA table is used for port selection; and (d) during an arbitration process only an arbitrating fibre channel device and a host port for the acceleration device are connected to the arbitrated loop and the acceleration device sends a benign primitive to non-arbitrating devices so that the non-arbitrating devices start the arbitration process when ports of the non-arbitrating devices are ready for arbitration;
   a global arbitration module that validates arbitration requests received from the plurality of fibre channel devices by using the AL_PA table;
   a controller module that operates in (i) a loop mode during which an isolated port receives data from an un-isolated port but data from the isolated port is not sent to the arbitrated loop; (ii) a spray mode when there is no active traffic for the arbitrated loop and data is sent from the host port to other ports; and (iii) a connection mode when there is traffic for the arbitrated loop and an isolated port receives a primitive but is unable to send frames to the arbitrated loop; and
   a state machine that uses a state of the arbitrated loop for changing fibre channel switch element states, instead of using individual port states of the plurality of fibre channel device ports.

2. The switch element of claim 1, wherein during an open process, the acceleration device connects a source fibre channel device that wins arbitration to a destination device via the host port and an open primitive is sent directly from the source fibre channel device to the destination device and in response the destination device directly sends a response primitive (R_RDY) to the source fibre channel device.

3. The switch element of claim 2, wherein non-destination devices receive a benign primitive during the open process to maintain proper loop state machine state instead of receiving an open primitive from the source fibre channel device.

4. The switch element of claim 1, wherein during an open replicate process the acceleration device receives an open replicate primitive from a source fibre channel device and creates a spray pattern to send the open replicate primitive at the same time directly to all ports with which the source fibre channel device intends to communicate.

5. The switch element of claim 1, wherein the acceleration device after the loop initialization process and during data transfer mode reconfigures a data path to directly connect active ports.

6. The switch element of claim 1, wherein during a data transfer mode after the loop initialization primitive process the acceleration device monitors arbitration requests, open requests and close primitives to determine which ports have traffic for creating connection points for a data path.

7. An acceleration device of a fibre channel switch element for connecting a plurality of fibre channel devices in an arbitrated loop via a host port, comprising:
   a global arbitration module that validates arbitration requests received from the plurality of fibre channel devices by using an arbitrated loop physical address (AL_PA) table populated with AL_PA values selected by the plurality of fibre channel devices and the AL_PA values are determined by the acceleration device during a loop initialization process when the acceleration device monitors frames that are sent by the plurality of fibre channel devices;
   a state machine module that uses a state of the arbitrated loop for changing fibre channel switch element states, instead of using individual port states of the plurality of fibre channel device ports;
   a switch matrix for connecting the plurality of fibre channel devices; and
   a controller module that operates in (i) a loop mode during which an isolated port receives data from an un-isolated port but data from the isolated port is not sent to the arbitrated loop; (ii) a spray mode when there is no active traffic for the arbitrated loop and data is sent from the host port to other ports; and (iii) a connection mode when there is traffic for the arbitrated loop and an isolated port receives a primitive but is unable to send flames to the arbitrated loop; wherein the AL_PA table is used for port selection; and during an arbitration process only an arbitrating fibre channel device and the host port for the acceleration device are connected to the arbitrated loop and the acceleration device sends a benign primitive to non-arbitrating devices so that the non-arbitrating devices start the arbitration process when ports of the non-arbitrating devices are ready for arbitration.

8. The acceleration device of claim 7, wherein during an open process, the acceleration device connects a source fibre channel device that wins arbitration to a destination device via the host port and an open primitive is sent directly from the source fibre channel device to the destination device and in response, the destination device directly sends a response primitive (R_RDY) to the source fibre channel device.

9. The acceleration device of claim 8, wherein non-destination devices receive a benign primitive during the open process to maintain proper loop state machine state instead of receiving an open primitive from the source fibre channel device.

10. The acceleration device of claim 7, wherein during an open replicate process the acceleration device receives an open replicate primitive from a source fibre channel device and creates a spray pattern to send the open replicate primitive at the same time directly to all ports with which the source fibre channel device intends to communicate.

11. The acceleration device of claim 7, wherein during a data transfer mode after the loop initialization process the acceleration device monitors arbitration requests, open requests and close primitives to determine which ports have traffic for creating connection points for a data path.

12. A method for accelerating traffic in a fibre channel arbitrated loop topology where a fibre channel switch element with an acceleration device couples a plurality of fibre channel devices to the arbitrated loop via a host port, comprising:

monitoring fibre channel frames during a loop initialization process;

creating an arbitrated loop physical address (AL_PA) table based on AL_PA values selected by the plurality of fibre channel devices; wherein the AL_PA table values are used by a global arbitration module for validating arbitration requests during an arbitration process when only an arbitrating fibre channel device and the host port for the acceleration device are connected to the arbitrated loop and the acceleration device sends a benign primitive to non-arbitration devices so that the non-arbitrating devices start the arbitration process when ports of the non-arbitrating devices are ready for arbitration;

using the AL_PA table for identifying ports;

connecting a source fibre channel device that sends an OPEN primitive to a destination port;

sending a benign primitive to a non-destination device connected to the arbitrated loop so that the non-destination device maintains a proper loop state machine state;

creating a spray pattern after receiving an open replicate primitive from a fibre channel device; and sending frames directly to a plurality of destination ports at the same time.

13. The method of claim 12, wherein the acceleration device includes a state machine that uses a state of the arbitrated loop for changing fibre channel switch element states, instead of using individual port states of the plurality of fibre channel device ports.

* * * * *

UNITED STATES PATENT AND TRADEMARK OFFICE
CERTIFICATE OF CORRECTION

PATENT NO. : 7,463,646 B2
APPLICATION NO. : 10/889267
DATED : December 9, 2008
INVENTOR(S) : John M Fike et al.

It is certified that error appears in the above-identified patent and that said Letters Patent is hereby corrected as shown below:

Title Page
On page 4, in column 1, Item [56] under "Other Publications" line 22, delete "05 805 636.6" and insert -- 05 805 632.6 --, therefor.

In column 1, line 22-23, delete "The disclosures of the foregoing applications are incorporated herein by reference in their entirety." and insert the same on Line 19 above "BACKGROUND".

In column 6, line 49, delete "belo v" and insert -- below --, therefor.

In column 7, line 57, delete "ioop" and insert -- loop --, therefor.

In column 16, line 17, delete "Latency-" and insert -- Latency= --, therefor.

Signed and Sealed this
Fifteenth Day of March, 2011

David J. Kappos
*Director of the United States Patent and Trademark Office*